Jan. 22, 1952   E. F. OLSEN   2,583,340
RESILIENT DISCHARGE VALVE FOR DISPENSERS
OPERATED BY PRESSURE OF THE CONTENTS
Filed Oct. 18, 1949   2 SHEETS—SHEET 1
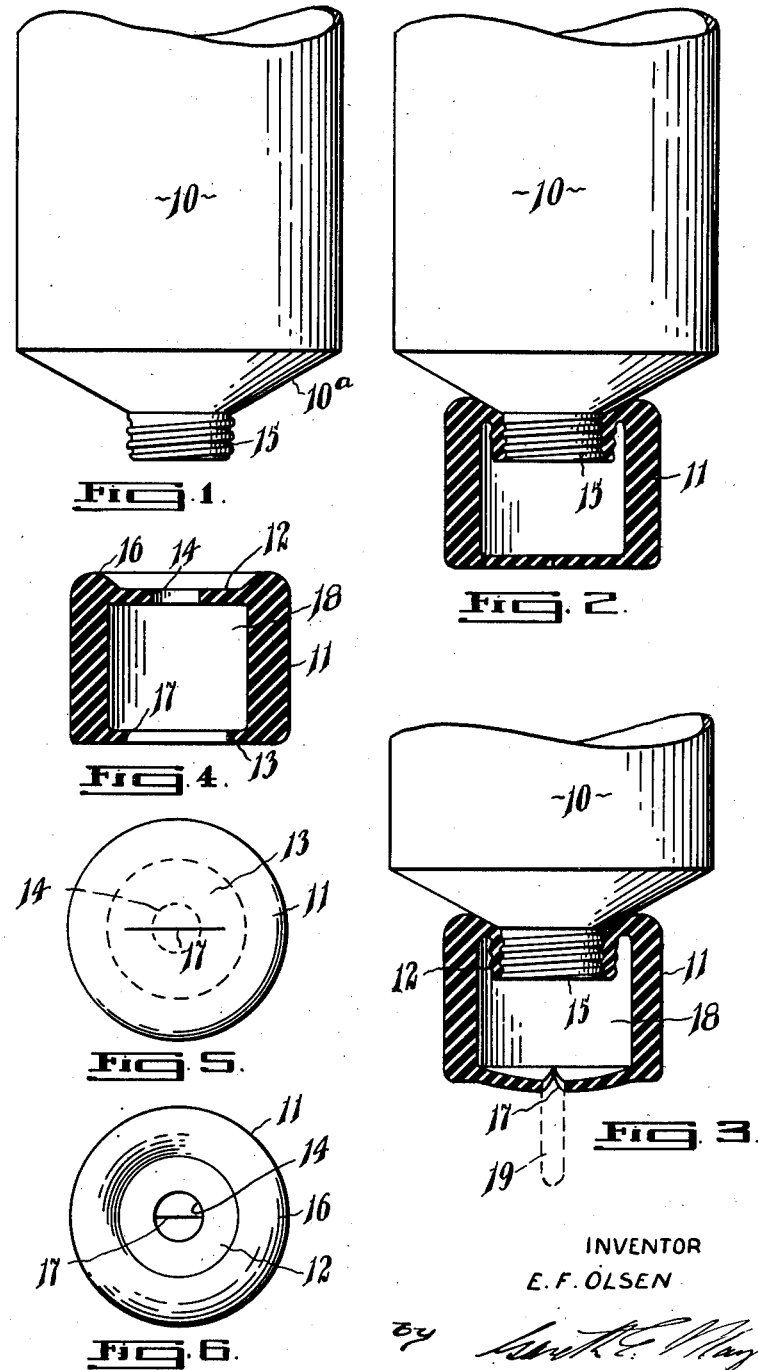
INVENTOR
E. F. OLSEN

INVENTOR
E. F. OLSEN

Patented Jan. 22, 1952

2,583,340

UNITED STATES PATENT OFFICE 2,583,340

RESILIENT DISCHARGE VALVE FOR DISPENSERS OPERATED BY PRESSURE OF THE CONTENTS

Elof F. Olsen, Brantford, Ontario, Canada

Application October 18, 1949, Serial No. 121,952

2 Claims. (Cl. 222—490)

1

This application is a continuation-in-part of my co-pending application Serial No. 43,867 filed on August 12, 1948, Patent No. 2,492,533, December 27, 1949.

The invention relates to improvements in valves for dispensers which are adapted to dispense pastes or liquids by the application of pressure, such as collapsible tubes commonly used for dispensing tooth paste, shaving cream and the like.

The main object of the invention is to provide a convenient discharge valve which will normally remain tightly closed and which will open only when the user applies sufficient pressure to the tube, the valve in its closed position forming a hygienic seal.

A further object of this invention is to provide a discharge valve which when made of suitable material will possess sufficient inherent elasticity to close automatically against resistance offered by the material being dispensed. This object is attained by providing a discharge opening in the form of a slit in a resilient membrane, whereby the thin edges of the slit will easily cut through the paste or other material being dispensed and cleanly sever the discharged portion from the portion remaining in the valve.

A further object of the invention is to provide a discharge valve which will be responsive to slight variations in pressure applied to the material being dispensed so as to permit close regulation of the amount dispensed at any time.

A further object of the invention is to provide a discharge valve which will conveniently fit over the neck of dispensing container of a variety of conventional designs and sizes.

A further object of the invention is to provide a discharge valve which lends itself to convenient thorough cleaning of the inside of the valve.

All of the foregoing and still further objects and advantages of the invention will be apparent from a study of the following specification, taken in conjunction with the accompanying drawings, wherein like characters of reference indicate corresponding parts throughout the several views and wherein:

Fig. 1 is a fragmentary side view of a conventional type of collapsible tube having a neck, shown as an example of the type of dispenser with which the invention is adapted to be used;

Fig. 2 is a side view partly in section of one embodiment of the invention as applied to the dispenser shown in Fig. 1;

Fig. 3 is a side view partly in section of the assembly shown in Fig. 2 during the actual operation of dispensing a paste;

Fig. 4 is a sectional view of the valve illustrated in Fig. 2 but shown not attached to a dispenser, and taken at right angles to the view illustrated in Fig. 2;

Fig. 5 is a bottom view of the said valve;

Fig. 6 is a top view of the said valve;

Figure 7:
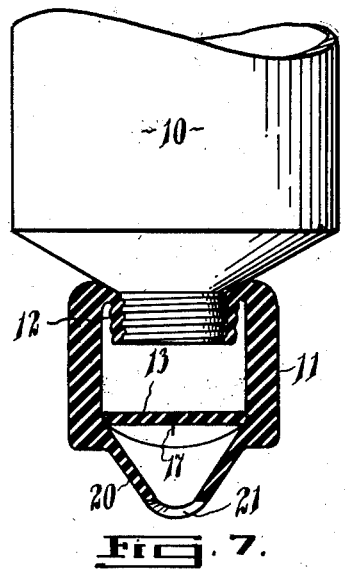
Fig. 7 is a side view partly in section of a modified embodiment of the invention.
Figure 8:
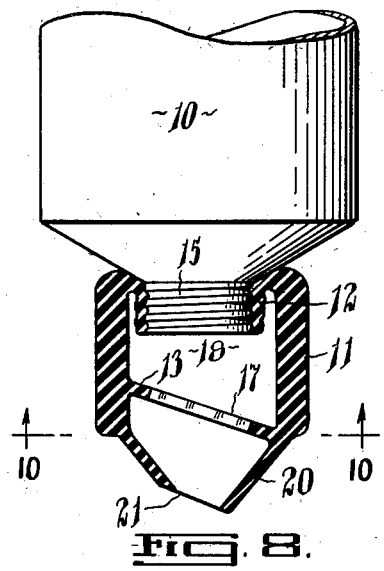
Fig. 8 is a side view partly in section of the valve shown in Fig. 7 but taken at right angles to the view shown in Fig. 7.
Figure 9:
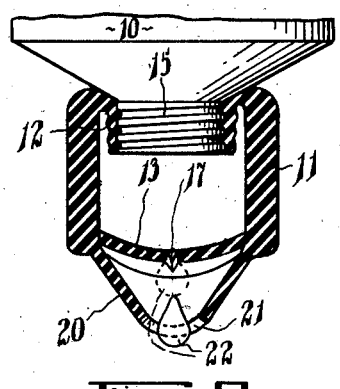
Fig. 9 is a side view partly in section of the valve shown in Fig. 7, during the actual operation of dispensing a liquid.
Figure 10:
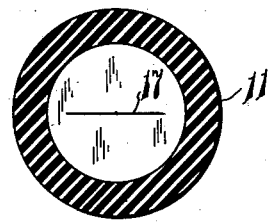
Fig. 10 is a sectional view taken on the line 10—10 in Fig. 8.

The discharge valve illustrated is essentially a hollow shell of suitable material constituting a chamber adapted to receive and then dispense the material contained in a collapsible tube or like container 10. The valve is preferably cylindrical in shape, although another suitable shape may be adopted, and has a side wall 11 connecting an inlet end wall 12 with an outlet end wall 13. The end walls 12 and 13 are formed so as to be easily deformable and resilient while the side walls 11 are relatively non-deformable; if the discharge valve is made in one piece as shown from a suitable yielding material such as rubber, the side wall 11 will be relatively thick so as to hold its shape and the end walls 12 and 13 will in effect be resilient membranes integral with the side wall 11.

The inlet end wall 12 has a central circular opening 14 adapted to yieldingly receive neck 15 of the container 10. The hole 14 is so dimensioned that inlet end wall 12 will securely engage a variety of sizes of container necks such as neck 15 and when the neck is inserted the inlet wall 12 will be constrained to extend downwardly into the discharge valve and lie against the side wall of the neck 15 to a greater or less degree depending on the diameter of the neck; the stretched material of the inlet end wall 12 will therefore tend to resist withdrawal of the container. This manner of attaching the valve also ensures that there will be a tight seal between the container and the valve. The side wall 11 preferably extends upwardly beyond inlet end wall 12 as shown to form an annular crown 16 so shaped as to conform to the usual configuration of the end 10ᵃ of the container 10.

The outlet wall 13 is also a thin resilient member, in which there is provided a transverse slit 17. This slit is cut so as to remain tightly closed when the outlet end wall 13 is not under stress, and the length of the slit is predetermined according to the consistency or viscosity of the material to be dispensed and the resiliency of the outlet end wall 13 with the object that the desired amount of pressure exerted on the tube may eject a convenient quantity of the material; the slit will generally extend along a diameter of the end wall for approximately three-quarters of the diameter.

When the discharge valve is mounted on a container, as for instance a collapsible tube of the type usually used for containing tooth paste or shaving cream, pressure exerted on the tube in the usual way will cause the contents to be ejected into chamber 18 within the valve. When the chamber 18 is full, further pressure on the container will exert a uniform pressure on the inner surface of outlet end wall 13, thereby causing slit 17 to open to a degree proportional to the amount of pressure exerted, allowing the desired amount of material to be dispensed in the form of a ribbon 19. When the application of pressure is interrupted, outlet end wall 13 will tend to resume its original condition, causing the edges of slit 17 to come together, cutting off the dispensed portion of the material and forming a seal which will protect the material within the chamber 18 from loss by evaporation and from external contamination. It will therefore be seen that the form of valve illustrated in Figs. 2 to 6 is particularly adapted for the dispensing of pastes having a relatively high viscosity as compared to liquids.

In Figs. 7 to 11 there is illustrated an embodiment of the discharge valve which is particularly adapted for the dispensing of liquids such as hair lotion, liquid soap, hand lotion and the like. In this form the outlet membrane or end wall 13 is tilted at an angle and the side wall 11 is extended downwardly and tapered inwardly to form a cone-shaped outlet spout 19 having an outlet opening 20. In this modification, the transverse slit 17 in end wall 13 is cut along the axis of greatest inclination so as to have one end lower than the other. This feature promotes quick and complete draining of the discharged liquid. In other respects the discharge valve is similar to the embodiment above described for dispensing pastes, and the operation of this form of the discharge valve is the same. The provision of the spout 19 permits the liquid material dispensed in the form of drops 22 to be more easily collected, as for instance into the hollow of the user's hand.

Figure 12:
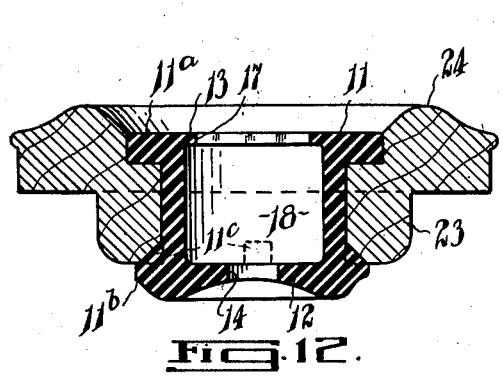
Fig. 12 is a further modified form of the valve as adapted for mounting on a mechanical dispenser or bracket and also formed to facilitate dispensing a paste upwardly.
Figure 11:
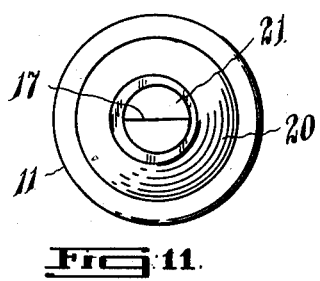
Fig. 11 is a bottom view of the said modified form of the valve.

The discharge valve is equally well adapted to be used with a simple pressure-dispensed container or collapsible tube which is manually operated or with a mechanical dispenser of any suitable form. Such a mechanical dispenser is described in my co-pending application Serial No. 43,867, Patent No. 2,492,533. A suitable means for mounting the discharge valve on a bracket or in a mechanical dispenser is shown in Fig. 12. The side 11 of the valve is formed with an annular groove between a flange 11ᵃ and an annular ridge 11ᵇ. A support member 23 is engaged by the annular groove and serves to support the discharge tube on a suitable bracket, or the support member 23 may form the cover for a mechanical dispensing apparatus. Suitable buttresses or other projections 11ᶜ may be provided to engage corresponding notches in the support member 23 and prevent the valve from turning within the support member. If added hygienic precautions are desired, the support member 23 may be used to facilitate the attachment of a simple cylindrical shield depending from the periphery of the outlet end wall 13, whereby touching of the outlet end wall by users will be discouraged.

If it is desired to mount the discharge valve so as to dispense a paste upwardly, the outlet end is formed with a dished outer surface 24 provided by an annular ridge or crown 24 surrounding the valve. The crown 24 may be formed in the support member 23 as shown in Fig. 12 or may be constituted by a rounded extension of side wall 11 beyond outlet end wall 13. A concavity is thereby provided at the outlet end of the valve in which the dispensed paste material, such as face cream, may be received and from which it may conveniently be removed by the tip of a finger or a suitable instrument.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. A valve for a container for materials dispensed by the application of pressure to the container and having a neck portion, comprising a cylindrical material-receiving chamber having an endless side wall and resilient inlet and outlet membranes providing end walls, the inlet membrane having a central opening receiving the neck portion of the container and of substantially smaller dimensions than the cross-sectional dimensions of the neck portion of the container, a portion of the inlet membrane surrounding the central opening forming a stretched cylindrical band of substantial axial length extending toward the outlet of the neck portion and perpendicular to the remainder of the inlet membrane to resist withdrawal of the neck portion from the valve in consequence of pressure exerted in the chamber, the outlet membrane having a transverse slit providing mutually abutting slit edges when the membrane is in a condition of rest, the outlet membrane being deformable by internal fluid pressure exerted in the chamber as a result of normal dispensing pressure on the container to separate the slit edges and provide an outlet for material in the chamber, the abutment of the slit edges being restorable by the resiliency of the outlet membrane to cut off the flow of material when the membrane returns to a condition of rest in consequence of internal pressure ceasing to be exerted in the chamber.

2. A valve for a container for materials dispensed by the application of pressure to the container and having a neck portion, comprising a cylindrical material-receiving chamber having an endless side wall and resilient inlet and outlet membranes providing end walls, the inlet membrane having a central opening receiving the neck portion of the container and of substantially smaller dimensions than the cross-sectional dimensions of the neck portion of the container, a portion of the inlet membrane surrounding the central opening forming a stretched cylindrical band of substantial axial length extending toward the outlet of the neck portion and perpendicular to the remainder of the inlet membrane to resist withdrawal of the neck portion from the valve in consequence of pressure exerted in the chamber, the outlet membrane being completely flat in a condition of rest and having a straight transverse slit providing mutually abutting slit edges, the outlet membrane being deformable by internal fluid pressure exerted in the chamber as a result of normal dispensing pressure on the container to separate the slit edges and provide an outlet for material in the chamber, the abutment of the slit edges being restorable by the resiliency of the outlet membrane to cut off the flow of material when the membrane re-assumes a flattened state in consequence of internal pressure ceasing to be exerted in the chamber.

ELOF F. OLSEN.

REFERENCES CITED

The following references are of record in the file of this patent:

UNITED STATES PATENTS

| Number    | Name     | Date          |
|-----------|----------|---------------|
| 1,647,215 | Elsas    | Nov. 1, 1927  |
| 1,980,642 | Tanfield | Nov. 13, 1934 |
| 2,094,700 | Gunn     | Oct. 5, 1937  |
| 2,219,604 | Trotter  | Oct. 29, 1940 |

FOREIGN PATENTS

| Number  | Country       | Date          |
|---------|---------------|---------------|
| 409,919 | Great Britain | May 10, 1934  |
| 50,839  | Denmark       | Oct. 28, 1935 |